Nov. 6, 1962 C. J. ARNDT 3,062,361
TROUGHING IDLER ASSEMBLY FOR LOW ROPE INSTALLATIONS
Filed Aug. 31, 1959 2 Sheets-Sheet 1
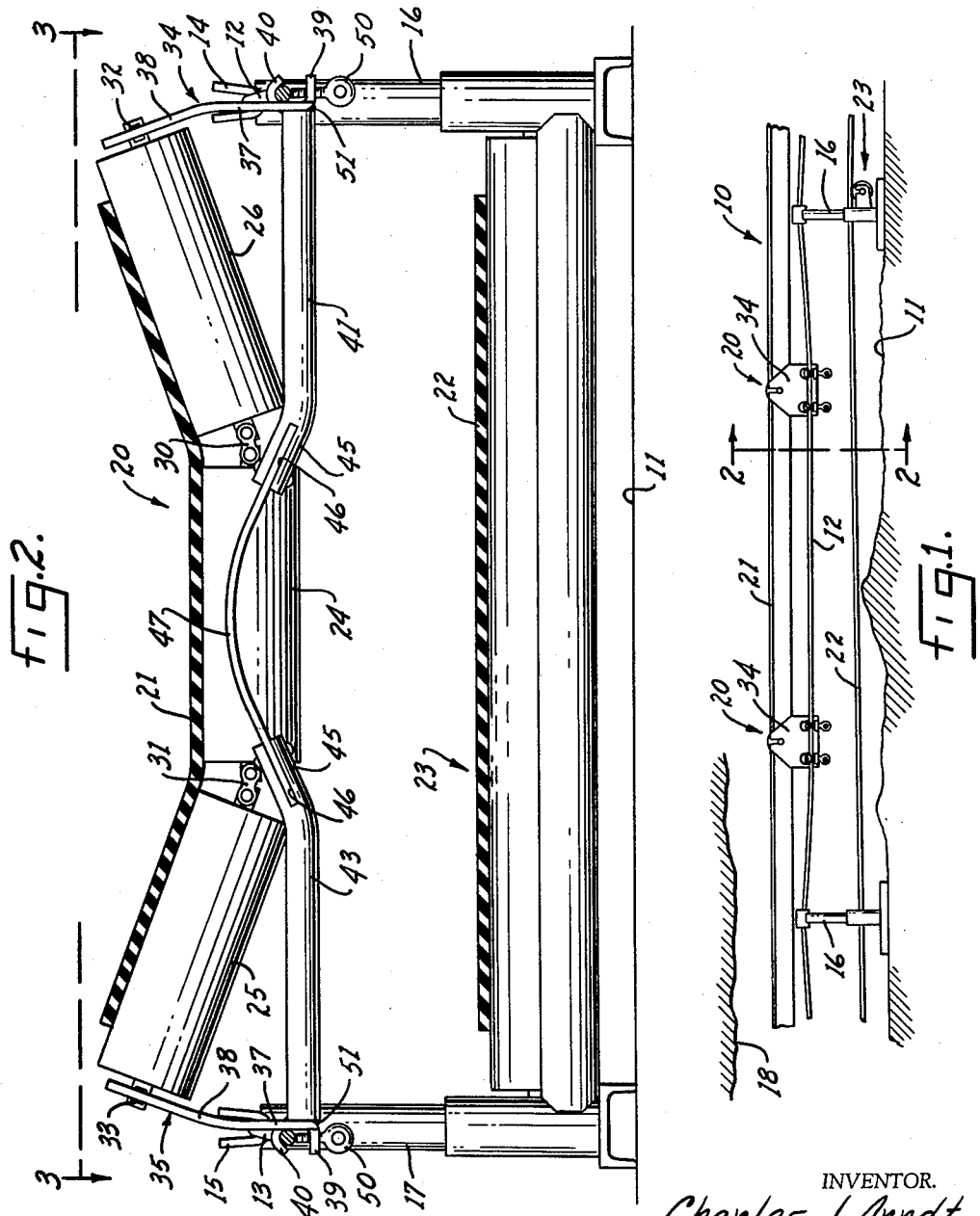
INVENTOR.
Charles J. Arndt,
BY Parker & Carter
Attorneys.

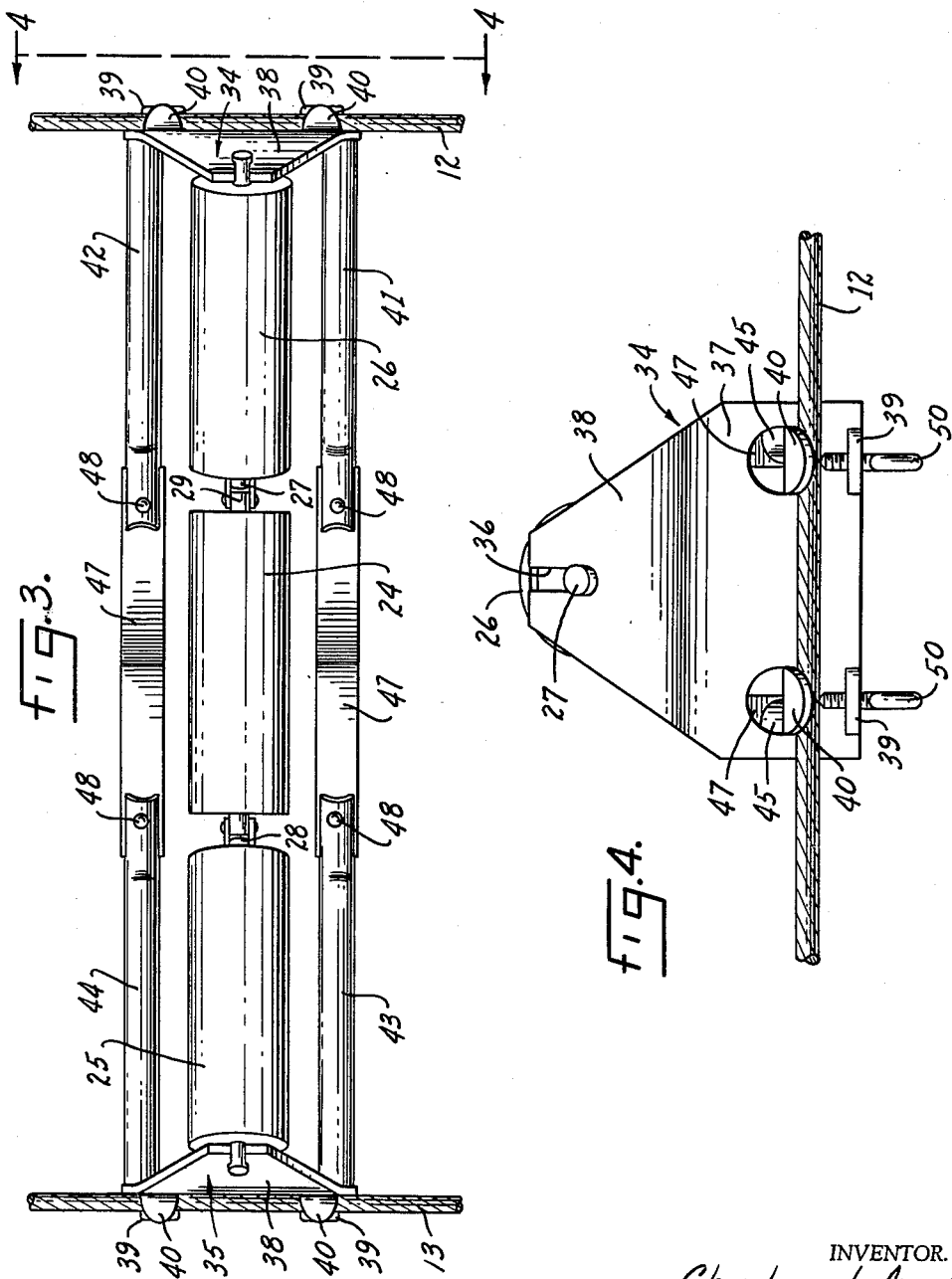

United States Patent Office 3,062,361
Patented Nov. 6, 1962

1

3,062,361
TROUGHING IDLER ASSEMBLY FOR LOW
ROPE INSTALLATIONS
Charles J. Arndt, Harvey, Ill., assignor to Goodman
Manufacturing Company, Chicago, Ill., a corporation
of Illinois
Filed Aug. 31, 1959, Ser. No. 836,980
1 Claim. (Cl. 198—192)

This invention relates generally to flexible strand conveyors, and particularly to a troughing idler assembly for such conveyors intended for use in low clearance installations.

Flexible strand conveyors of the type illustrated in the Craggs et al. Patent No. 2,773,257 have come into an increasingly widespread use due to their inherent desirable features. This type of conveyor generally includes a pair of flexible strands, such as wire ropes, which are trained along a conveying course, such as a mine run. The strands are supported at spaced intervals by suitable supporting structure such as ground support stands or roof hangers. A plurality of troughing idler assemblies, which generally consist of a center primary load carrying roller flanked by a pair of end or wing rollers, are suspended at spaced intervals from the flexible strands. These roller assemblies, which may be either free to flex with respect to one another or fixed in either a vertical or horizontal direction, or both, form a bed for the conveying reach of a conveyor belt. The return reach of the conveyor belt, which passes beneath the conveying reach, is supported by a plurality of return roller assemblies. These return roller assemblies vary widely, but they generally include a long roller supported by the ground engaging support stands, or independently supported from the strands or roof.

In operation, conveyed material, such as coal, is placed on the conveying reach at the working face and conveyed to a head section where it is dumped on to either another conveyor belt or mine cars. The flexibility of the wire ropes, or rope sideframes as they are generally called, permits flexure of the troughing idler assemblies in accord with load. As load approaches a troughing idler assembly, and assuming the individual rollers in the assembly are free to flex in a vertical plane with respect to one another, the belt assumes a troughing contour. The strands flex transversely inwardly toward one another and vertically downwardly, and the troughing idler assemblies are displaced bodily downwardly as well as inwardly. When the load passes, the troughing contour flattens out and the idler assembly moves upwardly to its no load position.

In applications in which there is plenty of vertical clearance for the conveyor, the downward sag of the troughing idler assemblies under load is no problem, because the support stands may be of such height as to maintain the flexible wire ropes a sufficient distance above the return reach of the belt to prevent interference of the belt and troughing idler assemblies. In many applications, such as coal mines, the clearance may be only five feet, or even less, and in these instances, the sag of the troughing idler assembly may be so great as to interfere with the return reach of the conveyor belt. This interference increases the power needed to run the belt and causes wear on the upper surface of the return reach. If a bump or projection on the mine floor prevents the natural sag of the belt between adjacent return roller assemblies, wear on the lower surface also occurs.

Accordingly, a primary object of this invention is to prevent interference between the return reach and the loaded conveying reach of a flexible strand conveyor in low clearance applications.

Another object is to provide a troughing idler assembly peculiarly adapted for low rope applications.

Yet another object is to provide a troughing idler assembly which progressively resists downward movement of the loaded conveying reach of the belt while permitting troughing movement of the idler assembly.

A further object is to provide a troughing idler assembly wherein substantial troughing movement of the idler assembly is feasible while sagging of the flexible strand wire rope sideframes is minimized.

Yet a further object is to reduce belt edge wear by elevating the ends of the rollers of the troughing idler assembly above the rope sideframes.

Yet another object is to permit troughing of the rollers in the troughing idler assembly while minimizing bodily downward displacement of the entire assembly by spreading the gauge of the flexible strands at the idler assembly connections.

Other objects and advantages will become apparent from the following description taken in connection with the accompanying drawings wherein by way of illustration and example certain embodiments of the invention are set forth.

The invention is illustrated more or less diagrammatically in the accompanying drawings, wherein:

FIGURE 1 is a side elevational view of a portion of a flexible strand conveyor embodying the present invention;

FIGURE 2 is a section taken substantially on the line 2—2 of FIGURE 1;

FIGURE 3 is a top plan view taken substantially along the line 3—3 of FIGURE 2 with parts omitted for clarity; and FIGURE 4 is a view taken along the line 4—4 of FIGURE 3.

Like reference numerals will refer to like parts throughout the specification and drawings.

In FIGURES 1 and 2, a flexible strand conveyor is indicated generally at 10 resting on the ground 11 which may be the floor of a coal mine or the like. The conveyor includes a pair of flexible strands 12 and 13 received in U-shaped saddle members 14 and 15 welded to the upper ends of telescoping support stands 16 and 17. The roof 18 is spaced only a short height above the support stands. A plurality of troughing idler assemblies 20 are suspended at spaced intervals from the flexible strands 12 and 13 and form a bed for the conveying reach 21 of a flexible conveyor belt. The return reach 22 of the belt is supported by a plurality of return roller assemblies 23 which are spaced at somewhat greater intervals than the troughing idler assemblies 20. In this instance, the return roller assemblies are carried by the stands.

Referring now specifically to FIGURES 2 and 3, the troughing idler assembly 20 is shown, in this instance, as composed of a primary center load carrying roller 24 flanked by a pair of end or wing rollers 25 and 26. The abutting ends of the wing roller shafts 27, 28 and center roller shaft 29 are connected by links 30 and 31. The links permit flexing of the rollers with respect to one another in a vertical plane while restraining flexure in a plane parallel to the plane of the belt. The outer ends of the wing roller shafts are milled as at 32, 33.

The troughing idler assembly is suspended from the flexible strands by a resilient frame assembly shown best in FIGURES 2, 3, and 4. The frame assembly includes end plates 34, 35, each of which has slots 36 which receive the milled flats 32, 33 in the ends of the wing roller shafts. The end plates include lower, substantially upright portions 37, and upper slightly inwardly directed portions 38. The bottom edges of the plates are crimped to form outwardly directed flanges 39 and a pair of strand seating members or tabs 40 are punched from or otherwise suitably secured to the plates directly above the bottom flanges. Eye bolts 50 passing through suitable apertures in the flanges force the strands 12 and 13 into snug engagement in the strand seats 40.

Welded to the bottom of the lower portions 37 of the end plates as at 51 are a pair of inwardly extending substantially rigid frame members 41, 42 and 43, 44. Each of these elongated frame members, which may be solid or tubular, terminates in an upwardly slanted portion 45 which is slotted as at 46 to receive a relatively stiff, arcuately shaped leaf spring 47. Suitable bolts or other fastening means 48 connect the spring to the elongated frame members. The end plates 34, 35 and inwardly extending tubular members form in effect a unitary rigid tension member. The end plates, elongated frame members and the leaf springs form a resilient frame assembly which carries the roller assembly.

While the illustrated construction has proved practical, it will be understood that other constructions are feasible so long as the upwardly and inwardly extending portions of the frame assembly are rigid with respect to one another.

The use and operation of the invention is as follows:

It is highly desirable to maintain the rollers in troughing idler assemblies freely flexible whereby they may give in a vertical plane to form an increasingly deepening trough as a load approaches and passes. As the assembly troughs, the carrying capacity of the belt is materially increased, and the possibility of spillage is substantially minimized since the load tends to gravitate towards the center of the trough. In order to maintain sufficient clearance between the bottom of the rollers and the return reach of the conveyor, the supporting stands are usually elevated a good distance above the ends of the roller assemblies.

In the normal situation, as illustrated in the Craggs et al. patent for example, the projections of the axes of the wing roller shafts generally intersect the flexible strands. The tops of the saddles or supporting stands which carry the flexible strands must therefore be maintained a substantial distance above the points of intersection of the wing roller axes and the strands due to the natural sag of the wire ropes. This invention makes possible the use of substantially lower supporting stands while sacrificing little or no troughing effect of the roller assembly, thus decreasing the height of the conveyor.

In the embodiment illustrated, the flexible strands are supported at very low heights by the supporting stands 16 and 17, and the ends of the roller assemblies are elevated a substantial distance above the strands by the end plates 34, 35. The upper, outer edges of the wing rollers are thus the highest point of the conveyor. As a load approaches the troughing idler assembly of FIGURE 2, several effects occur. The interconnected rollers gradually assume a deeper and deeper troughing configuration. The downward movement of the rollers pulls inwardly on the end plates 34, 35. At the same time, the upwardly directed portions 45 of the elongated frame members are forced in a downward direction about the strands as pivot points since the end plates are rigidly connected to the elongated frame members. As frame members 41, 42 and 43, 44 swing downwardly, the leaf springs 47 tend to flatten out. The initial increments of movement of the leaf springs offer little resistance to the troughing effect, but the resistance to deflection becomes progressively higher as the spring approaches a straight line. Finally a point will be reached at which the spring will deflect no more. The spring is so designed that the point of maximum deflection will maintain the bottom of the center primary training roller 24 above and out of contact with the return reach 22 of the belt.

As the troughing movement progresses, the flexible strands 12 and 13 move outwardly from the no load position shown in FIGURE 2. This lengthening of the strand gauge is due to the increased effective distance between the center points of the strands resulting from the straightening of the leaf springs 47, 47. This transversely outward movement of the strands also tends to counteract the bodily downward displacement of the entire troughing idler assembly without interfering with the troughing configuration assumed by the rollers.

Although a preferred embodiment has been illustrated and described, it will be apparent that various other modifications will be apparent to those skilled in the art. For example, although a pair of elongated frame assembly members have been shown projecting inwardly from each end plate, it should be understood that single members with a single spring or resilient member therebetween may be utilized. The configuration of the end tension members of the frame assembly, which in this instance comprise side plates 34, 35 and inwardly extending elongated frame assembly members 41, 42 and 43, 44 may be considerably varied. The position of the strand seats on the end members may also be varied. It is only essential that a substantially rigid member be provided for transmitting tension from the wing roller shafts to the flexible strands and thence to a resilient member operatively connecting the flexible strands. Similarly, resilient members other than leaf springs 47, 47 may be utilized, so long as they are so contoured that their deflection or extending movement can be effectively translated into outward movement of the flexible strands.

The foregoing description is illustrative only and not definitive. Accordingly, the invention should not be limited except by the scope of the following appended claim.

I claim:

A flexible strand belt conveyor especially adapted for use in applications in which clearance between overlying conveyor belt reaches is at a minimum, said conveyor including, in combination, a pair of flexible strands and means for supporting and maintaining the strands generally parallel to one another along a conveying course, troughing idler assemblies suspended from the flexible strands at locations at which the strands are able to deflect in directions generally transverse to the conveying course, said troughing idler assemblies supporting the conveying reach of a flexible conveyor belt, return roller means supporting the return reach of the conveyor belt beneath the conveying reach, at least one of said troughing idler assemblies having a roller assembly comprising a plurality of rollers interconnected for flexing movement with respect to one another in a generally vertical plane, a resilient frame assembly for supporting the roller assembly and operable to transmit a portion of the downward load on the roller assembly into generally transversely outward movement of the strands, said frame assembly including a pair of tension members, each tension member having an upwardly extending end supporting the roller assembly and a generally transversely inward extending end, an elongated resilient bodily extensible and retractible deflecting member connected to the inwardly extending ends of the tension members, and means for connecting the tension members, and thereby the resilient frame assembly, to the flexible strands at locations generally opposite one another, said reflecting member being extensible in response to imposition of load on the roller assembly to thereby move the inwardly extending ends of the tension members away from one another, and consequently the strands to which they are connected transversely outwardly, to thereby minimize the downward sag of the roller assembly toward the return reach of the belt.

References Cited in the file of this patent

UNITED STATES PATENTS

| | | |
|---|---|---|
| 2,773,257 | Craggs et al. | Dec. 4, 1956 |
| 2,875,886 | Lo Presti et al. | Mar. 3, 1959 |
| 2,974,777 | Marsh | Mar. 14, 1961 |